United States Patent
Ju et al.

(10) Patent No.: US 11,628,360 B2
(45) Date of Patent: Apr. 18, 2023

(54) METHOD AND APPARATUS FOR CONTROLLING GAME APPLICATIONS

(71) Applicant: Samsung Electronics Co., Ltd., Suwon-si (KR)

(72) Inventors: Huaiwei Ju, Nanjing (CN); Hua Liu, Nanjing (CN); Kun Zhou, Nanjing (CN); Yong Huang, Nanjing (CN); Yuan Li, Nanjing (CN); Chao Zhu, Nanjing (CN); Chengming Xia, Nanjing (CN); Wenfang Zhao, Nanjing (CN); Ying Wang, Nanjing (CN); Jingyang Jia, Nanjing (CN); Pan Wang, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 16/727,666

(22) Filed: Dec. 26, 2019

(65) Prior Publication Data

US 2020/0206621 A1 Jul. 2, 2020

(30) Foreign Application Priority Data

Dec. 27, 2018 (CN) .......................... 201811609362.5

(51) Int. Cl.
*A63F 13/493* (2014.01)
*G06F 9/4401* (2018.01)
(Continued)

(52) U.S. Cl.
CPC ............ *A63F 13/493* (2014.09); *A63F 13/48* (2014.09); *G06F 9/4418* (2013.01);
(Continued)

(58) Field of Classification Search
CPC .. A63F 13/493; A63F 13/48; A63F 2300/636; G06N 20/00; G06N 5/04; G06F 9/4418; G06F 9/5016; G06F 9/5022
See application file for complete search history.

(56) References Cited

U.S. PATENT DOCUMENTS

| 2012/0052873 A1* | 3/2012 | Wong ............... H04W 52/0251 |
| | | 455/456.1 |
| 2016/0019746 A1* | 1/2016 | Lyons ............... G06Q 20/3224 |
| | | 463/31 |

(Continued)

FOREIGN PATENT DOCUMENTS

| CN | 103297249 A | 9/2013 |
| CN | 104142828 A | 11/2014 |

(Continued)

OTHER PUBLICATIONS

Chinese Office Action dated Nov. 24, 2021, issued in Chinese Patent Application No. 201811609362.5.

(Continued)

*Primary Examiner* — William H McCulloch, Jr.
*Assistant Examiner* — Ankit B Doshi
(74) *Attorney, Agent, or Firm* — Jefferson IP Law, LLP (57) ABSTRACT

A method and apparatus for controlling game applications are provided. In the method, when an operating system receives a game starting command, the operating system determines a manner to start a corresponding game application according to whether the game application has resided in a memory, and when a cold boot manner is used, the operating system triggers the game application to report an amount of memory required currently by the game application, and determines whether a requirement of running the game application is met according to the amount of memory required and an amount of memory currently used, or the operating system ensures to meet the requirement of running the game application through background application freezing and clearing. When the game application finishes running, the operating system uses a pre-trained machine learning model to predict running hotness of the game application on the terminal device according to a current operating parameter of the game application, sorts (Continued)

game applications on the terminal device according to the running hotness, and performs a corresponding residing process when determining that the game application needs to reside in the memory according to a sorting result. The method can efficiently shorten the time cost to start the game application.

15 Claims, 3 Drawing Sheets

(51) Int. Cl.
  *G06F 9/50* (2006.01)
  *G06N 20/00* (2019.01)
  *G06N 5/04* (2023.01)
  *A63F 13/48* (2014.01)

(52) U.S. Cl.
  CPC .......... *G06F 9/5016* (2013.01); *G06F 9/5022* (2013.01); *G06N 5/04* (2013.01); *G06N 20/00* (2019.01); *A63F 2300/636* (2013.01)

(56) References Cited

U.S. PATENT DOCUMENTS

| | | | |
|---|---|---|---|
| 2016/0248688 A1 | 8/2016 | Barsness et al. | |
| 2016/0295482 A1* | 10/2016 | Belghoul | H04W 36/32 |
| 2018/0124230 A1* | 5/2018 | Muthukumar | G06F 1/1684 |
| 2019/0220216 A1 | 7/2019 | Chen et al. | |
| 2020/0064456 A1* | 2/2020 | Xu | G01S 13/765 |
| 2020/0218456 A1 | 7/2020 | Zeng | |

FOREIGN PATENT DOCUMENTS

| | | |
|---|---|---|
| CN | 104225919 A | 12/2014 |
| CN | 106055358 A | 10/2016 |
| CN | 106484472 A | 3/2017 |
| CN | 106815038 A | 6/2017 |
| CN | 107203899 A | 9/2017 |
| CN | 107241758 A | 10/2017 |
| CN | 107343083 A | 11/2017 |
| CN | 107613107 A | 1/2018 |
| CN | 107648844 A | 2/2018 |
| CN | 107729062 A | 2/2018 |
| CN | 107729081 A | 2/2018 |
| CN | 107729143 A | 2/2018 |
| CN | 107748685 A | 3/2018 |
| CN | 108261763 A | 7/2018 |
| CN | 108595231 A | 9/2018 |
| KR | 10-2017-0055881 A | 5/2017 |

OTHER PUBLICATIONS

Supplementary Search dated Aug. 1, 2022, issued in Chinese Application No. 201811609362.5.

Chinese Notice of Allowance dated Aug. 15, 2022, issued in Chinese Application No. 201811609362.5.

* cited by examiner

METHOD AND APPARATUS FOR CONTROLLING GAME APPLICATIONS

CROSS-REFERENCE TO RELATED APPLICATION(S)

This application is based on and claims priority under 35 U.S.C. § 119 of a Chinese patent application number 201811609362.5, filed on Dec. 27, 2018, in the Chinese Intellectual Property Office, the disclosure of which is incorporated by reference herein in its entirety.

BACKGROUND

1. Field

The disclosure relates to the computer applications technology and in particular to a method and an apparatus for controlling game applications.

2. Description of Related Art

As the level of hardware on mobile terminals is improved increasing every year, using a large-capacity random access memory (RAM) is a development trend in the industry. The time cost to start a game is relatively longer compared to that cost to start a general application, as the game relates to loading a relatively large number of resources, which affect the user experience.

The inventor of the disclosure find, during carrying out the disclosure, that a traditional optimization solution for the issue of long start time of the game applications usually adopts an optimization solution only for the operating system of the terminal, and does not consider the requirements of a real scene that needs to be loaded, so that the optimization solution only for the operating system cannot efficiently reduce the time cost to start a game application.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or advantages and to provide at least the advantages described below. Accordingly, an aspect of the disclosure is to provide a method and an apparatus for controlling game applications to efficiently reduce the time to start a game application.

Additional aspects will be set forth in part in the description which follows and, in part, will be apparent from the description, or may be learned by practice of the presented embodiments.

To achieve the above object, embodiments of the disclosure provide the following technical schemes.

In accordance with an aspect of the disclosure, a method for controlling game applications is provided. The method may include the operations of: determining whether a corresponding game application is resident in a memory, based on an operating system of a terminal device receiving a game starting command; based on the game application being resident in the memory, performing, by the operation system, at least one of an unfreezing and wake-up operation on the game application in the memory to start the game application, or starting the game application in a cold boot manner, wherein, before the starting of the game application, the operating system triggering the game application to report an amount of memory required for loading a scene needed for the starting; determining whether an amount of memory that is currently free meets a requirement of running the game application according to the amount of memory required and current memory usage; based on a determination that the amount of memory that is currently free meets the requirement of running the game application according to the amount of the memory required and the current memory usage, triggering a background application freezing and clearing procedure so that the amount of memory currently free meets the requirement of running the game application based on a determination that the game application has finished running, using a pre-trained machine learning model to predict running hotness of the game application on the terminal device according to a current operating parameter of the game application and other specified sorting parameters, sorting running hotness of all game applications on the terminal device according to a predicted result, and determining whether to allow the game application that finishes running to reside in the memory according to a sorting result, and based on a determination to allow the game application that finishes running to reside in the memory according to the sorting result, at least one of performing a process of residing in the memory for the game application, or freeing up system resources occupied by the game application.

Preferably, the determining of whether the amount of memory currently free meets the requirement of running the game application includes, based on a difference between the amount of memory currently free and the amount of memory required being larger than or equal to a product of a total amount of system memory and a preset ratio threshold for safely running, at least one of determining that the amount of memory currently free meets the requirement of running the game application, or determining that the amount of memory currently free does not meet the requirement of running the game application.

Preferably, the background application freezing and clearing procedure may include subtracting the difference from the product to obtain a minimum amount of memory that currently needs to be freed up; and freezing or clearing background applications according to a principle of freezing priority and according to the minimum amount of memory, so that an amount of memory freed up is larger than or equal to the minimum amount of memory, wherein, based on performing the clearing, an application currently not used for a longest time is cleared first.

Preferably, the current operating parameter of the game application includes a time of the starting and a run time of the game application after the starting, and the other specified sorting parameters include a user age and a hotness ranking of the game application on an internet.

Preferably, the determining of whether to allow the game application that finishes running to reside in the memory according to the sorting result includes calculating a product of a total amount of system memory and a preset usage ratio threshold for games, determining game applications that are allowed to reside in the memory according to the product and the sorting result and according to a principle that a game application with a top ranking is allowed to reside in the memory in priority, in which a difference between a total amount of memory needed by the determined game applications and the product is within a preset difference range, and based on the game application that finishes running being included in the determined game applications, at least one of determining that the game application that finishes running needs to reside in the memory, or determining that the game application that finishes running does not need to reside in the memory.

Preferably, before performing the process of residing in the memory for the game application, the method further includes based on the amount of memory currently free being smaller than the amount of memory required by the game application that finishes running, freeing-up a corresponding amount of memory to meet a residing requirement of the game application that finishes running by clearing other game applications that are already resident in the memory.

Preferably, the method further includes based on starting the game application and the operating system detects that currently a condition to disable Wi-Fi scanning is satisfied, enabling a Wi-Fi scanning disabling function, in which the condition to disable Wi-Fi scanning is that current network access is performed through a cellular mobile network, and a Wi-Fi function is turned on but there is not an available hotspot.

Preferably, the method further includes during running of the game application, based on a round of game being over and a game lobby scene being returned to, triggering the operating system to turn on the Wi-Fi function in the background and silently scan for an available hotspot, and based on the available hotspot being found, at least one of connecting the available hotspot found, or enabling the Wi-Fi scanning disabling function again.

Preferably, the method further includes during running of the game application, based on a preset key scene that needs to be loaded, notifying the operating system to schedule a key thread and a related thread group of the preset key scene to run on a big-core central processing unit (CPU).

Preferably, the method further includes based on, after the game application is started, and the operating system receives a game version upgrade message, giving-up determining whether to allow the game application that finishes running to reside in the memory and related processing operations.

Preferably, the method further includes during running of the game application, based on the operating system needing to scale down a CPU frequency, before scaling down the CPU frequency, sending a notification of scaling down the CPU frequency to the game application, and then scaling down the CPU frequency after a preset time interval after sending the notification, and adaptively reducing, by the game application, an image frame rate and an image quality according to the notification of scaling down the CPU frequency.

In accordance with another aspect of the disclosure, an apparatus for controlling game applications is provided. The apparatus for controlling game applications, may be configured in a terminal device, and include an operating system module and a game application module. The operating system module may be configured to determine whether a corresponding game application is resident in a memory, based on an operating system of the terminal device receiving a game starting command, based on the game application being resident in the memory, perform at least one of an unfreezing and wake-up operation on the game application in the memory to start the game application in the game application module, or start the game application in a cold boot manner, and before starting the game application, the operating system triggers the game application to report an amount of memory required for loading a scene needed for the starting, determine whether an amount of memory that is currently free meets a requirement of running the game application according to the amount of memory required and current memory usage, based on a determination that the amount of memory that is currently free meets the requirement of running the game application according to the amount of the memory required and the current memory usage, triggers a background application freezing and clearing procedure so that the amount of memory currently free meets the requirement of running the game application, and based on a determination that the game application has finished running, use a pre-trained machine learning model to predict running hotness of the game application on the terminal device according to a current operating parameter of the game application and other specified sorting parameters, sort running hotness of all game applications on the terminal device according to a predicted result, determine whether to allow the game application that finishes running to reside in the memory according to a sorting result, and based on a determination to allow the game application that finishes running to reside in the memory according to the sorting result, at least one of perform a process of residing in the memory for the game application, or free up system resources occupied by the game application.

Preferably, the operating system module is further configured to, based on a difference between the amount of memory currently free and the amount of memory required being larger than or equal to a product of a total amount of system memory and a preset ratio threshold for safely running, determine that the amount of memory currently free meets the requirement of running the game application, or otherwise, determine that the amount of memory currently free does not meet the requirement of running the game application.

Preferably, the operating system module is further configured to subtract the difference from the product to obtain a minimum amount of memory that currently needs to be freed up, and freeze or clear background applications according to a principle of freezing priority and according to the minimum amount of memory, so that an amount of memory freed up is larger than or equal to the minimum amount of memory, wherein when performing the clearing, an application currently not used for a longest time is cleared first.

Preferably, the current operating parameter of the game application includes a time of the starting and a run time of the game application after the starting, and the other specified sorting parameters include a user age and a hotness ranking of the game application on an internet.

Preferably, the operating system module is further configured to calculate a product of a total amount of system memory and a preset usage ratio threshold for games, determine game applications that are allowed to reside in the memory according to the product and the sorting result and according to a principle that a game application with a top ranking is allowed to reside in the memory in priority, wherein a difference between a total amount of memory needed by the determined game applications and the product is within a preset difference range, and based on the game application that finishes running being included in the determined game applications, at least one of determine that the game application that finishes running needs to reside in the memory, or determine that the game application that finishes running does not need to reside in the memory.

Preferably, the operating system module is further configured to before performing the process of residing in the memory for the game application, based on the amount of memory currently free being smaller than the amount of memory required by the game application that finishes running, free-up a corresponding amount of memory to meet a residing requirement of the game application that finishes running by clearing other game applications that are already resident in the memory.

Preferably, the operating system module is further configured to, based on starting the game application and the operating system detects that currently a condition to disable Wi-Fi scanning is satisfied, enable a Wi-Fi scanning disabling function, wherein the condition to disable Wi-Fi scanning is that current network access is performed through a cellular mobile network, and a Wi-Fi function is turned on but there is not an available hotspot.

Preferably, the game application module is further configured to during running of the game application, based on a round of game being over and a game lobby scene being returned to, trigger the operating system to turn on the Wi-Fi function in the background and silently scan for an available hotspot, and based on the available hotspot being found, at least one of connect the available hotspot found, or enable the Wi-Fi scanning disabling function again.

Preferably, the game application module is further configured to during running of the game application, when a preset key scene needs to be loaded, notify the operating system to schedule a key thread and a related thread group of the preset key scene to run on a big-core central processing unit (CPU).

Preferably, the operating system module is further configured to, based on, after the game application is started and the operating system receives a game version upgrade message, give up determining whether to allow the game application that finishes running to reside in the memory and related processing operations.

Preferably, the operating system module is further configured to during running of the game application, based on the operating system needing to scale down a CPU frequency, before scaling down the CPU frequency, send a notification of scaling down the CPU frequency to the game application, and then scale down the CPU frequency after a preset time interval after sending the notification, and the game application module is further configured to adaptively reduce an image frame rate and an image quality according to the notification of scaling down the CPU frequency.

In accordance with another aspect of the disclosure, a non-transitory computer readable storage medium is provided. The non-transitory computer readable storage medium includes storing instructions, in which the instructions, when executed by a processor, cause the processor to perform the above method for controlling game applications.

In accordance with another aspect of the disclosure, an electronic device is provided. The electronic device includes the above non-transitory computer readable storage medium and at least one processor that can access the non-transitory computer readable storage medium.

In summary, the disclosure provides a method and an apparatus for controlling game applications, in which when an operating system receives a game starting command, the operating system determines a manner to start a corresponding game application according to whether the game application is resident in a memory, and when a cold boot manner is used, the operating system triggers the game application to report an amount of memory required currently by the game application, and determines whether a requirement of running the game application is met according to the amount of memory required and an amount of memory currently used, and if not, the operating system ensures to meet the requirement of running the game application through background application freezing and clearing; and when the game application finishes running, the operating system uses a pre-trained machine learning model to predict running hotness of the game application on the terminal device according to a current operating parameter of the game application, sorts game applications on the terminal device according to the running hotness, and performs a corresponding residing process when determining that the game application needs to reside in the memory according to a sorting result. In this way, when the game application finishes running, through sorting the game applications on the terminal device according to the actual operating situation of the game application on the terminal device and determining whether the game application needs to reside in the memory according to the sorting result, game applications that are frequently used by the user can reside in the memory. In this way, when these game applications are started, it is not necessary to perform a process to load the game applications to the memory, so as to dramatically reduce the time cost by the game applications frequently used. In addition, predicting the running hotness of the game application on the terminal device through the pre-trained machine learning model, the accuracy of a predicted result may be improved, which is beneficial to reducing the time cost to start a game application frequently used. Moreover, in the above technical scheme, every time when a game application is started in the cold boot manner, the amount of free memory of the system needs to be controlled and adjusted according to the amount of memory required currently for loading a scene needed by starting the game application, and thus, on the one hand, the normal running requirement of the game application can be met, and on the other hand, the accuracy of determining whether the game application can reside in the memory after the game application finishes running can be improved, which further is beneficial to reducing the time cost to start the game application frequently used.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

To make the object, technical schemes and advantages of the disclosure more apparent, the disclosure will be further described according to the following embodiments with reference to the drawings.

Figure 1:
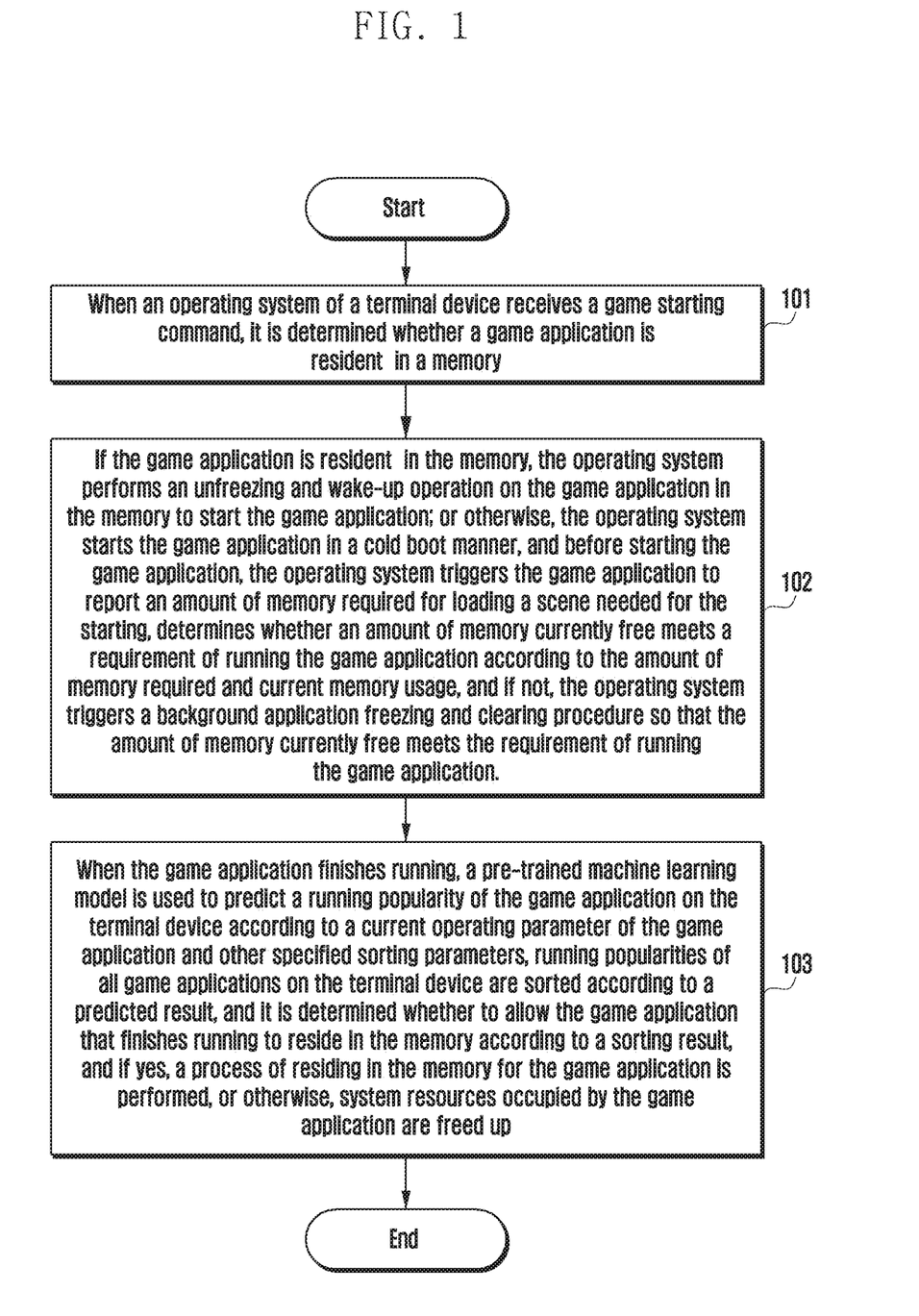
FIG. 1 is a schematic diagram of a flowchart of a method according to an embodiment of the disclosure.

FIG. 1 is a schematic diagram of a flowchart of a method according to an embodiment of the disclosure. Referring to FIG. 1, the method for controlling game applications implemented in the embodiment includes the following steps:

Referring to FIG. 1, in operation 101, when an operating system of a terminal device receives a game starting command, it is determined whether a game application is resident in a memory.

Referring to FIG. 1, in operation 102, if the game application is resident in the memory, the operating system performs an unfreezing and wake-up operation on the game application in the memory to start the game application; or otherwise, the operating system starts the game application in a cold boot manner, and before starting the game application, the operating system triggers the game application to report an amount of memory required for loading a scene needed for the starting, determines whether an amount of memory currently free meets a requirement of running the game application according to the amount of memory required and current memory usage, and if not, the operating system triggers a background application freezing and clearing procedure so that the amount of memory currently free meets the requirement of running the game application.

In this operation, if the game application is resident in the memory, then the game application is stated in a warm boot manner, so as to efficiently reduce the time cost to start the game application.

Herein, through determining whether the amount of system memory currently free meets the requirement of running the game application according to the amount of memory required for loading the scene needed for starting the game application, and if not, freeing up a corresponding amount of system memory through freezing and clearing background applications, the method can guarantee a stable frame rate during the game, and ensure the game application to run smoothly, so as to prevent a game application stutter issue.

Preferably, in this operation, determining whether the amount of memory currently free meets the requirement of running the game application may be performed through the following:

If a difference between the amount of memory currently free and the amount of memory required is larger than or equal to a product of a total amount of system memory and a preset ratio threshold for safely running, it is determined that the amount of memory currently free meets the requirement of running the game application, or otherwise, it is determined that that the amount of memory currently free does not meet the requirement of running the game application.

The ratio threshold for safely running may be preset by a person skilled in the art according to actual needs, which will not be elaborated herein.

Preferably, based on the above method of determining whether the amount of memory currently free meets the requirement of running the game application, the background application freezing and clearing procedure may be: subtracting the difference from the product to obtain a minimum amount of memory that currently needs to be freed up; and freezing and/or clearing background applications according to a principle of freezing priority and according to the minimum amount of memory, so that an amount of memory freed up is larger than or equal to the minimum amount of memory; in which when performing the clearing, an application currently not used for a longest time is cleared first.

Herein, considering that a game application has a larger cost in aspects of memory and processor resources compared to a general application, to guarantee a good user experience such as smoothness and interference-free properties of the game application, based on the amount of memory required for loading the scene needed for starting the game application reported by the game application, applications that have not been used for a long time will be cleared and restart of these applications will be restricted, so as to free up an amount of memory and processor resources accordingly.

In addition, herein through the principle of freezing priority, applications recently used are frozen in priority to free up processor resources corresponding to the applications, so as to ensure the smoothness of the game application, and meanwhile reduce the time to restart these applications, and reduce the impacts on these applications.

In real implementations, a specific time length to freeze an application may be set by a person skilled in the art according to actual needs, which will not be elaborated herein.

Referring to FIG. 1, in operation 103, when the game application finishes running, a pre-trained machine learning model is used to predict running hotness of the game application on the terminal device according to a current operating parameter of the game application and other specified sorting parameters, running hotness of all game applications on the terminal device are sorted according to a predicted result, and it is determined whether to allow the game application that finishes running to reside in the memory according to a sorting result, and if yes, a process of residing in the memory for the game application is performed, or otherwise, system resources occupied by the game application are freed up.

In this operation, when the game application finishes running, through using the pre-trained machine learning model to predict the running hotness of the game application on the terminal device according to the current operating parameter of the game application and other specified sorting parameters of the game application, the accuracy of the prediction result can be guaranteed.

Herein, when the game application finishes running, through updating the rankings of running hotness of all game applications on the terminal device according to the current operating situation of the game application, the accuracy of ranking the running hotness can be guaranteed, and further the accuracy of determining game applications that need to reside in the memory based on ranking the running hotness can be guaranteed, and thus the accuracy of selecting game applications that need to reside in the memory can be guaranteed, and further the time cost to start a game application that a user frequently uses can be reduced to the largest extent.

Preferably, the related operating parameter may include: a time of the starting and a run time of the game application after the starting.

It is to be specified that different from a traditional game application, to enable the operating system to predict running hotness of the game application on the terminal device after the game application finishes running, a run time of the game application needs to be recorded when the game application is running.

The other specified sorting parameters may specifically include: a user age and a hotness ranking of the game application on an internet, but are not limited thereto, and a person skilled in the art may select other user profiling parameters to determine the running hotness of the game application.

Preferably, in this operation, the following method may be used to determine whether to allow the game application that finishes running to reside in the memory according to the following sorting result:

Step a1, calculating a product of a total amount of system memory and a preset usage ratio threshold for games.

The usage ratio threshold for games may be set by a person skilled in the art according to actual needs, which will not be elaborated herein.

Step a2, determining game applications that are allowed to reside in the memory according to the product and the sorting result and according to a principle that a game application with a top ranking is allowed to reside in the memory in priority, in which a difference between a total amount of memory needed by the determined game applications and the product is within a preset difference range.

The difference range is used to control an amount of memory occupied by game applications that actually reside in the memory to be close to an ideal amount of memory determined according to the usage ratio threshold for games, and the difference range may be set by a person skilled in the art according to actual needs.

For example, if a physical memory is 6 gigabyte (GB), and 10% of it, i.e., 600 MB memory is used for game applications to reside in, after sorting the running hotness of all game applications in this step, it is found that top N (N≥1) game applications have occupied 600 megabyte (MB) memory, then it is determined that the N game applications can reside in the memory.

Step a3, if the game application that finishes running is included in the determined game applications, then determining that the game application that finishes running needs to reside in the memory, or otherwise, the game application that finishes running does not need to reside in the memory.

Preferably, to enable the process of residing in the memory to proceed smoothly, before performing the process of residing in the memory for the game application, the method further includes: if the amount of memory currently free is smaller than the amount of memory required by the game application that finishes running, then freeing up a corresponding amount of memory to meet a residing requirement of the game application that finishes running by clearing other game applications that are already resident in the memory.

Preferably, the method further includes: when starting the game application, if the operating system detects that currently a condition to disable Wi-Fi scanning is satisfied, enabling a Wi-Fi scanning disabling function, in which the condition to disable Wi-Fi scanning is that current network access is performed through a cellular mobile network, and a Wi-Fi function is turned on but there is not an available hotspot.

Herein, when the game is started, a network switching scenario is detected for and recognized, and when it is detected that the Wi-Fi function of the current system is turned on, that there is not an available hotspot, and that the user plays the game through a cellular mobile network (e.g., a $4^{th}$ generation (4G) network), then Wi-Fi scanning is prohibited, so as to ensure that no network switching happens during the game.

Preferably, to ensure the game application to run smoothly, the method further includes: during running of the game application, when a round of game is over and a game lobby scene is returned to, triggering the operating system to turn on the Wi-Fi function in the background and silently scan for an available hotspot, and if the available hotspot is found, connecting the available hotspot found, or otherwise, enabling the Wi-Fi scanning disabling function again.

Herein, when the round of game is over and the game lobby scene is returned to, the game application will notify this to the system. In case that the network switching function works, the system will turn on the Wi-Fi function in the background and silently scan for an available hotspot, and if the available hotspot is found, the available hotspot is connected, or otherwise, no connection is performed, and the Wi-Fi function is turned off again. In this case, the network switching will not cause a bad user experience, and meanwhile can save the traffic.

Preferably, to ensure the game application to run smoothly, the method may further include: during running of the game application, when a preset key scene needs to be loaded, notifying the operating system to schedule a key thread and a related thread group of the preset key scene to run on a big-core CPU.

The key scene may be set according to a specific scene of the game application, e.g., entering into scenes such as a team battle, opening an amplifier, and shooting.

Using the above method, when the game application enters into scenes such as a team battle, opening the amplifier, and shooting, it will notify this information to the system through a game scene communication mechanism, and when the system receives the notification, the system will guarantee key resources for the game application, e.g., scheduling given key thread and related thread group of the key scene to run on the big-core CPU, and scale up the CPU frequency so as to improve the execution efficiency. Advantages of enabling the resources to favor the key scene are that the key scene can be executed rapidly so as to ensure the game frame rate to be smooth and stable, and ensure the game application not to stutter and drop frames, thus resulting in a better user experience.

Preferably, to reduce the impact of upgrading the game version on the running of the game application, the method may further include: if after the game application is started, the operating system receives a game version upgrade message, giving up determining whether to allow the game application that finishes running to reside in the memory and related processing operations.

Herein, when a game version upgrading message arrives, the operation of enabling the game application to reside in the memory is deemed to be given up after the application finishes running this time, so as to upgrade the game version when the game is started next time in a cold boot manner, and in this way, the game version can be updated in time and meanwhile the necessity of residing in the memory can be determined precisely.

Preferably, to avoid the impact of scaling down the CPU frequency on the game application, the method may further include: during running of the game application, if the operating system needs to scale down a CPU frequency, before scaling down the CPU frequency, sending a notification of scaling down the CPU frequency to the game application, and then scaling down the CPU frequency after a preset time interval after sending the notification; and the game application adaptively reducing an image frame rate and an image quality according to the notification of scaling down the CPU frequency.

Herein, considering that game applications cost resources heavily, and often cause the system to generate a lot of heat and scale down the frequency, and the system unilaterally scaling down the frequency of the processor is a main reason that causes the game to stutter, herein the system notify the frequency scaling down to the game application in advance, so that the game application can adaptively reduce the image frame rate, the image quality and so on according to the notification, to address the issues of frame drops and stutter caused by the system scaling down the frequency.

Herein, the detailed procedure of adaptively reducing the image frame rate and the image quality may be set by a person skilled in the art according to actual needs, and will not be elaborated herein.

Figure 2:
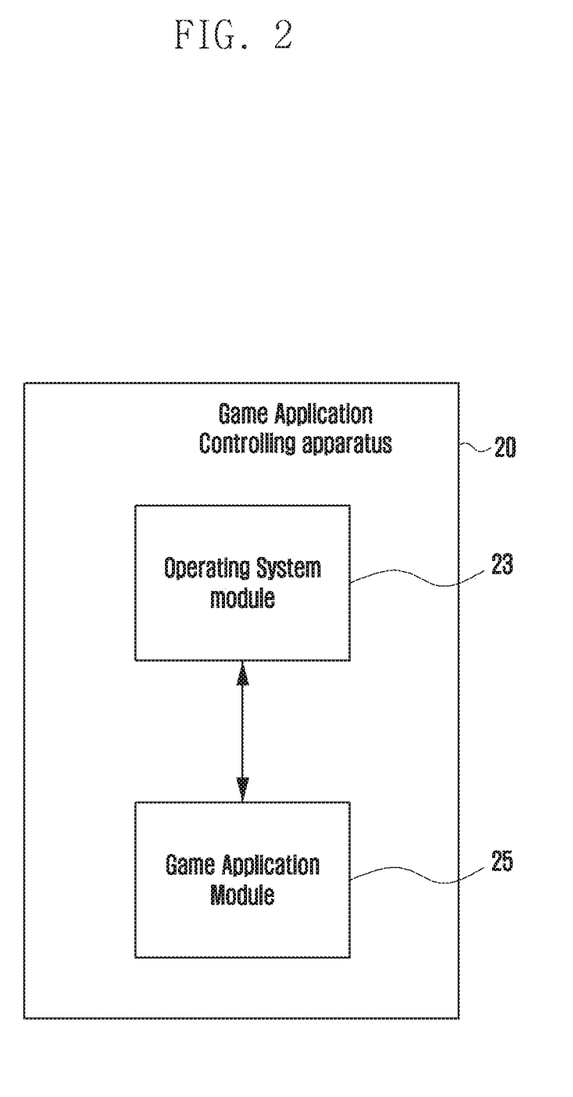
FIG. 2 is a schematic diagram of a structure of an apparatus according to an embodiment of the disclosure.

FIG. 2 is a schematic diagram of a structure of an apparatus according to an embodiment of the disclosure. With reference to FIGS. 1 and 2, corresponding to the method embodiment, the embodiments of the disclosure further provide an apparatus for controlling game applications, configured in a terminal device, and the apparatus 20 includes: an operating system module 23 and a game application module 25, in which the operating system module is configured to determine whether a corresponding game application resides in a memory, when an operating system of the terminal device receives a game starting command; if the game application is resident in the memory, the operating system performs an unfreezing and wake-up operation on the game application in the memory to start the game application in the game application module; otherwise, the operating system starts the game application in a cold boot manner, and before starting the game application, the operating system triggers the game application to report an amount of memory required for loading a scene needed for the starting, determines whether an amount of memory currently free meets a requirement of running the game application according to the amount of memory required and current memory usage, and if not, triggers a background application freezing and clearing procedure so that the amount of memory currently free meets the requirement of running the game application; when the game application finishes running, use a pre-trained machine learning model to predict running hotness of the game application on the terminal device according to a current operating parameter of the game application and other specified sorting parameters, sort running hotness of all game applications on the terminal device according to a predicted result, and determining whether to allow the game application that finishes running to reside in the memory according to a sorting result, and if yes, perform a process of residing in the memory for the game application, or otherwise, free up system resources occupied by the game application.

Preferably, the operating system module is configured to: if a difference between the amount of memory currently free and the amount of memory required is larger than or equal to a product of a total amount of system memory and a preset ratio threshold for safely running, determine that the amount of memory currently free meets the requirement of running the game application, or otherwise, determine that the amount of memory currently free does not meet the requirement of running the game application.

Preferably, the operating system module is configured to: subtract the difference from the product to obtain a minimum amount of memory that currently needs to be freed up; and freeze or clear background applications according to a principle of freezing priority and according to the minimum amount of memory, so that an amount of memory freed up is larger than or equal to the minimum amount of memory; in which when performing the clearing, an application currently not used for a longest time is cleared first.

Preferably, the current operating parameter of the game application includes: a time of the starting and a run time of the game application after the starting; and the other specified sorting parameters comprise a user age and a hotness ranking of the game application on an internet.

Preferably, the operating system module is configured to: calculate a product of a total amount of system memory and a preset usage ratio threshold for games; determine game applications that are allowed to reside in the memory according to the product and the sorting result and according to a principle that a game application with a top ranking is allowed to reside in the memory in priority, wherein a difference between a total amount of memory needed by the determined game applications and the product is within a preset difference range; and if the game application that finishes running is included in the determined game applications, then determine that the game application that finishes running needs to reside in the memory, or otherwise, determine that the game application that finishes running does not need to reside in the memory.

Preferably, the operating system module is further configured to: before performing the process of residing in the memory for the game application, if the amount of memory currently free is smaller than the amount of memory required by the game application that finishes running, then free up a corresponding amount of memory to meet a residing requirement of the game application that finishes running by clearing other game applications that are already resident in the memory.

Preferably, the operating system module is further configured to: when starting the game application, if the operating system detects that currently a condition to disable Wi-Fi scanning is satisfied, enable a Wi-Fi scanning disabling function, in which the condition to disable Wi-Fi scanning is that current network access is performed through a cellular mobile network, and a Wi-Fi function is turned on but there is not an available hotspot.

Preferably, the game application module is further configured to: during running of the game application, when a round of game is over and a game lobby scene is returned to, trigger the operating system to turn on the Wi-Fi function in the background and silently scan for an available hotspot, and if the available hotspot is found, connect the available hotspot found, or otherwise, enable the Wi-Fi scanning disabling function again.

Preferably, the game application module is further configured to: during running of the game application, when a preset key scene needs to be loaded, notify the operating system to schedule a key thread and a related thread group of the preset key scene to run on a big-core CPU.

Preferably, the operating system module is further configured to: if after the game application is started, the operating system receives a game version upgrade message, give up determining whether to allow the game application that finishes running to reside in the memory and related processing operations.

Preferably, the operating system module is further configured to: during running of the game application, if the operating system needs to scale down a CPU frequency, before scaling down the CPU frequency, send a notification of scaling down the CPU frequency to the game application, and then scale down the CPU frequency after a preset time interval after sending the notification; and the game application module is further configured to adaptively reduce an image frame rate and an image quality according to the notification of scaling down the CPU frequency.

The disclosure further provides a non-transitory computer readable storage medium, storing instructions, in which the instructions, when executed by a processor, cause the processor to perform the above method for controlling game applications.

The disclosure further provides an electronic device, including the above non-transitory computer readable storage medium and a processor that can access the non-transitory computer readable storage medium.

The detailed implementation of the disclosure will be further described in combination with a specific application scenario. The embodiment is used merely to more clearly illustrate the technical scheme of the disclosure, and should not be construed as limitations to the protecting scope of the disclosure.

Figure 3:
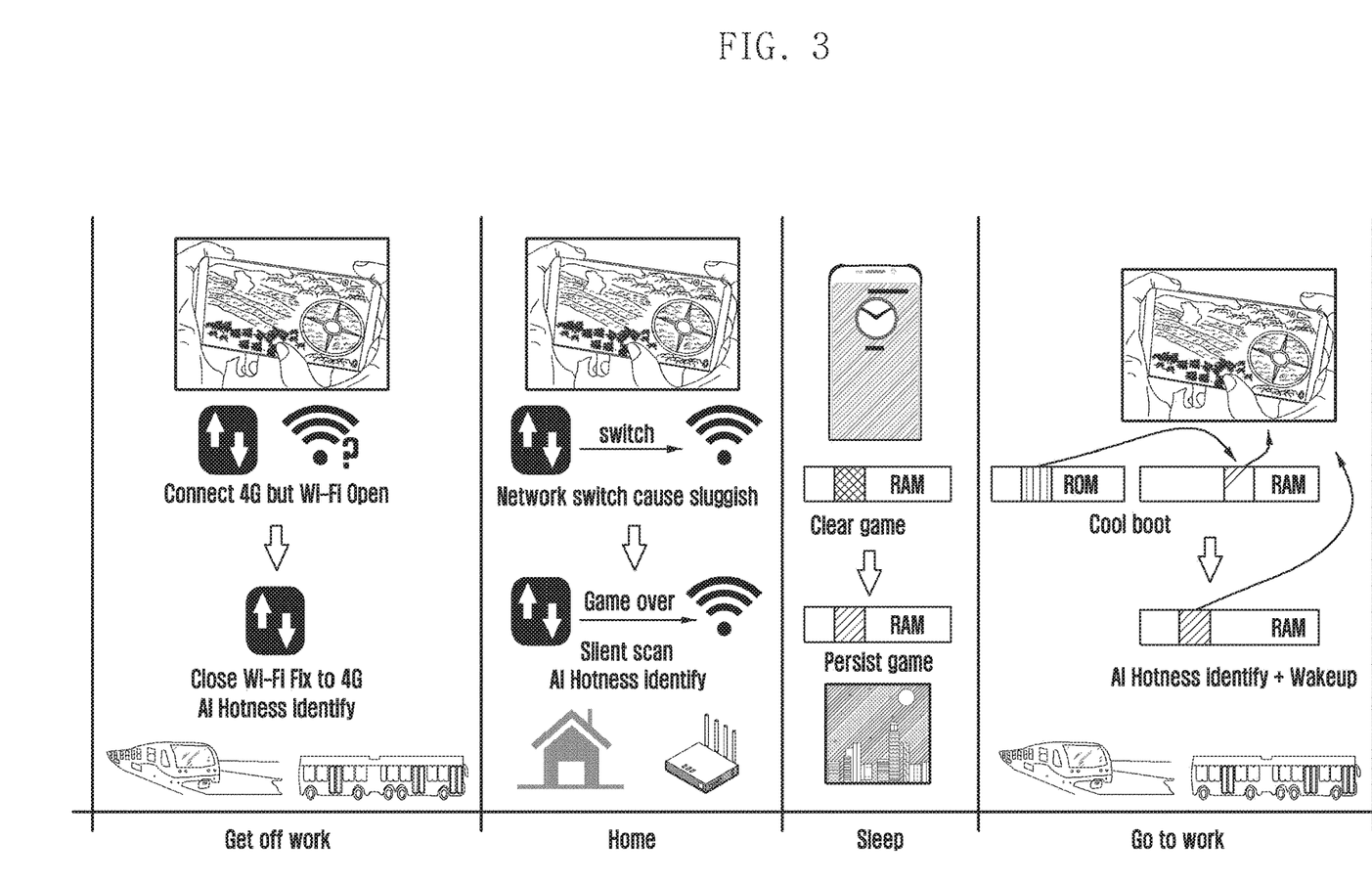
FIG. 3 is a schematic diagram showing a journey scene according to an embodiment of the disclosure.

A scenario is playing a game during a commute. Referring to FIG. 3, a procedure of implementing the disclosure in this scenario is as the following:

Step 1: when a user gets off work, without using the game mode of the disclosure, a Wi-Fi function on his mobile terminal is opened, but there is no hotspot to connect, and the user plays a game through a 4G network. Once the user arrives home, a hotspot that can be connected is, and network switching happens immediately. If the user is in a key scene of the game, e.g., a team battle, he may be defeated by an opponent due to the network switching, which affects the user experience of playing the foreground game. However, when the game mode of the disclosure is used, during the game, network switching will not happen, and once a round of game is over, the game will send a notification, and after the system performs analysis to obtain the notification, the system will silently scan for an available Wi-Fi hotspot in the background and connect to it, In this case, the network switching is performed in a non-key scene of the game, and will not affect the user experience and can save the traffic.

Step 2: When the user starts the game and during the game, an AI user game hotness prediction module will update rankings of games preferred by the user. Meanwhile, during the game, the processing of notifications such as a game version upgrade notification will be postponed to support the decision of whether the game should reside in the memory. This step is a new step added for the game mode.

Step 3: when the user exits the game, if the game meets a criterion of residing in the memory, then an operation of residing in the memory will be performed for the game at an appropriate time. The game's connections with the system will be cut off, only a piece of memory of the game is reserved to provide a fast start service when the user plays the game again later. If the game mode of the disclosure is not used, when the user exits the game, after a period of time, the memory of the game will be cleared, and therefore, when the user starts the game again, a long procedure of starting the game in the cold boot manner needs to be carried out.

Step 4: When the user goes to work and opens the game again, without using the game mode of the disclosure, the game will be started in the cold boot manner, resources are loaded to a RAM, and processor resources are allocated. With the game mode of the disclosure, it is not necessary to load the game again, but only to unfreeze and wake up the game resident in the memory, which saves many procedures of loading and starting the game, and only needs to unfreeze the game and allocate processor resources, the speed of which is equivalent to wake up the game from the background. The time cost to start a game application is longer than that cost to start a general application. In an intelligent terminal with a physical memory large enough, under the situation that an amount of free memory is large enough, rather than leaving the memory unused, it is preferred to open up a virtual memory pool as a game RAM. In this case, though a small part of physical memory is scarified, it is beneficial to improving the speed of starting the game.

The foregoing is only preferred embodiments of the disclosure and is not intended to limit the disclosure. Any modification, equivalent substitution, and improvement without departing from the spirit and principle of the disclosure should be covered in the protection scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling game applications in an electronic device, the method comprising:
   turning on a Wi-Fi scanning function;
   determining, when starting a game application, whether a first condition to disable Wi-Fi scanning is satisfied;
   turning off the Wi-Fi scanning function based on the first condition during executing the game application using a first network;
   turning on, when a round of the game application is over and a game lobby scene has returned, the Wi-Fi scanning function in a background; and
   switching, based on detecting a first available hotspot in relation to a second network, from the first network to the second network, which is connected to the first available hotspot,
   wherein the first condition is a condition in which a network access of the electronic device is performed through a cellular mobile network and the Wi-Fi scanning function is turned on without a second available hotspot, and
   wherein the first network comprises the cellular mobile network.

2. The method of claim 1,
   wherein the second network is a Wi-Fi network.

3. The method of claim 1, further comprising:
- determining whether the game application is resident in a memory, based on an operating system of the electronic device receiving a game starting command;
- based on the game application being resident in the memory, performing, by the operating system, at least one of:
  - an unfreezing and wake-up operation on the game application in the memory to start the game application, or
  - starting the game application in a cold boot manner, wherein, before the starting of the game application, the operating system triggering the game application is to report an amount of memory required for loading a scene needed for the starting;
- determining whether an amount of memory that is currently free meets a requirement of running the game application according to the amount of memory required and current memory usage;
- based on a determination that the amount of memory that is currently free meets the requirement of running the game application according to the amount of the memory required and the current memory usage, triggering a background application freezing and clearing procedure so that the amount of memory currently free meets the requirement of running the game application; and
- based on a determination that the game application has finished running,
  - using a pre-trained machine learning model to predict running hotness of the game application on the electronic device according to a current operating parameter of the game application and other specified sorting parameters,
  - sorting running hotness of all game applications on the electronic device according to a predicted result,
  - determining whether to allow the game application that has finished running to reside in the memory according to a sorting result, and
  - based on a determination to allow the game application that finishes running to reside in the memory according to the sorting result, at least one of:
    - performing a process of residing in the memory for the game application, or
    - freeing-up system resources occupied by the game application.

4. The method of claim 3, wherein the determining of whether the amount of memory currently free meets the requirement of running the game application comprises:
- based on a difference between the amount of memory currently free and the amount of memory required being larger than or equal to a product of a total amount of system memory and a preset ratio threshold for safely running, at least one of:
  - determining that the amount of memory currently free meets the requirement of running the game application, or
  - determining that the amount of memory currently free does not meet the requirement of running the game application.

5. The method of claim 4, wherein the background application freezing and clearing procedure comprises:
- subtracting the difference from the product to obtain a minimum amount of memory that currently needs to be freed up, and
- freezing or clearing background applications according to a principle of freezing priority and according to the minimum amount of memory, so that an amount of memory freed up is larger than or equal to the minimum amount of memory, and
- wherein, based on performing the clearing, an application currently not used for the longest time is cleared first.

6. The method of claim 3,
- wherein the current operating parameter of the game application comprises a time of the starting and a run time of the game application after the starting, and
- wherein the other specified sorting parameters comprise a user age and a hotness ranking of the game application on an internet.

7. The method of claim 3, wherein the determining of whether to allow the game application that has finished running to reside in the memory according to the sorting result comprises:
- calculating a product of a total amount of system memory and a preset usage ratio threshold for games;
- determining game applications that are allowed to reside in the memory according to the product and the sorting result and according to a principle that a game application with a top ranking is allowed to reside in the memory in priority, wherein a difference between a total amount of memory needed by the determined game applications and the product is within a preset difference range; and
- based on the game application that has finished running being included in the determined game applications, at least one of:
  - determining that the game application that has finished running needs to reside in the memory, or
  - determining that the game application that has finished running does not need to reside in the memory.

8. The method of claim 3, wherein, before performing the process of residing in the memory for the game application, the method further comprises:
- based on the amount of memory currently free being smaller than the amount of memory required by the game application that has finished running, freeing-up a corresponding amount of memory to meet a residing requirement of the game application that has finished running by clearing other game applications that are already resident in the memory.

9. The method of claim 3, wherein the method further comprises at least one of:
- during running of the game application, based on a preset key scene that needs to be loaded, notifying the operating system to schedule a key thread and a related thread group of the preset key scene to run on a big-core central processing unit (CPU), or
- based on, after the game application is started and the operating system receives a game version upgrade message, giving-up determining whether to allow the game application that has finished running to reside in the memory and related processing operations.

10. The method of claim 3, wherein the method further comprises:
- during running of the game application, based on the operating system needing to scale down a CPU frequency, before scaling down the CPU frequency, sending a notification of scaling down the CPU frequency to the game application, and scaling down the CPU frequency after a preset time interval after sending the notification; and
- adaptively reducing, by the game application, an image frame rate and an image quality according to the notification of scaling down the CPU frequency.

11. An electronic device for controlling game applications comprising:
an operating system module; and
a game application module,
wherein the operating system module is configured to:
turn on a Wi-Fi scanning function,
determine, when starting a game application, whether a first condition to disable Wi-Fi scanning is satisfied,
turn off the Wi-Fi scanning function during executing the game application using a first network,
turn on, when a round of the game application is over and a game lobby scene has returned, the Wi Fi scanning function in a background,
switch, based on detecting a first available hotspot in relation to a second network, from the first network to the second network, which is connected to the first available hotspot, and
turn off, based on identifying that there is no the first available hotspot in relation to the second network, the Wi-Fi scanning function,
wherein the first condition is a condition in which a network access of the electronic device is performed through a cellular mobile network and the Wi-Fi scanning function is turned on without a second available hotspot, and
wherein the first network comprises the cellular mobile network.

12. The electronic device of claim 11, wherein the operating system module is further configured to:
determine whether the game application is resident in a memory, based on an operating system of the electronic device receiving a game starting command, based on the game application being resident in the memory, perform at least one of:
an unfreezing and wake-up operation on the game application in the memory to start the game application in the game application module, or
start the game application in a cold boot manner, and before starting the game application, the operating system triggers the game application to report an amount of memory required for loading a scene needed for the starting,
determine whether an amount of memory that is currently free meets a requirement of running the game application according to the amount of memory required and current memory usage;
based on a determination that the amount of memory that is currently free meets the requirement of running the game application according to the amount of the memory required and the current memory usage, trigger a background application freezing and clearing procedure so that the amount of memory currently free meets the requirement of running the game application; and
based on a determination that the game application has finished running,
use a pre-trained machine learning model to predict running hotness of the game application on the electronic device according to a current operating parameter of the game application and other specified sorting parameters,
sort running hotness of all game applications on the electronic device according to a predicted result,
determine whether to allow the game application that has finished running to reside in the memory according to a sorting result, and
based on a determination to allow the game application that has finished running to reside in the memory according to the sorting result, at least one of:
perform a process of residing in the memory for the game application, or
free-up system resources occupied by the game application.

13. The electronic device of claim 12, wherein the current operating parameter of the game application comprises:
a time of the starting and a run time of the game application after the starting;
and the other specified sorting parameters comprise a user age and a hotness ranking of the game application on an internet.

14. The electronic device of claim 12, wherein the operating system module is further configured to:
before performing the process of residing in the memory for the game application, required by the game application that has finished running, free-up a corresponding amount of memory to meet a residing requirement of the game application that has finished running by clearing other game applications that are already resident in the memory.

15. The electronic device of claim 12,
wherein the game application module is further configured to at least one of:
during the running of the game application, when a preset key scene needs to be loaded, notify the operating system to schedule a key thread and a related thread group of the preset key scene to run on a big-core central processing unit (CPU), or
based on, after the game application is started and the operating system receives a game version upgrade message, give up determining whether to allow the game application that has finished running to reside in the memory and related processing operations,
wherein the operating system module is further configured to: during running of the game application, based on the operating system needing to scale down a CPU frequency, before scaling down the CPU frequency, send a notification of scaling down the CPU frequency to the game application, and then scale down the CPU frequency after a preset time interval after sending the notification, and
wherein the game application module is further configured to adaptively reduce an image frame rate and an image quality according to the notification of scaling down the CPU frequency.

* * * * *